Sept. 29, 1925.

E. T. FERNGREN 1,554,994

COOLER FOR SHEET GLASS APPARATUS

Filed Dec. 3, 1924

INVENTOR.
Enoch T. Ferngren.
Frank Fraser
ATTORNEY.

Patented Sept. 29, 1925.

1,554,994

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

COOLER FOR SHEET-GLASS APPARATUS.

Application filed December 3, 1924. Serial No. 753,597.

*To all whom it may concern:*

Be it known that I, ENOCH T. FERNGREN, a citizen of the United States, residing at Toledo, in the county of Lucas and State of Ohio, have invented new and useful Improvements in Coolers for Sheet-Glass Apparatus, of which the following is a specification.

The present invention relates to sheet glass drawing apparatus, and has particular reference to a heat-absorbing member for absorbing heat from the glass before it is drawn into sheet form to give a uniform temperature condition throughout the entire flow of said glass.

An important object of the invention is to provide heat-absorbing means in the form of a cooler, wherein the cooling medium is introduced within the cooler and discharged in a manner that the coolest portion of the cooler will be at the center thereof, while the border portions will be relatively higher in temperature.

A further object of the invention is to provide a cooler in sheet glass apparatus wherein the greatest heat absorption will be had at the central portion thereof, and gradually reducing in effect toward the outer extremities.

A still further object of the invention is to provide a cooler wherein a continuous flow of the cooling medium can be maintained therethrough, the greatest effect of the cooling medium being had at the center of said cooler.

Other objects and advantages of the invention will be apparent during the course of the following description.

Figure 1:
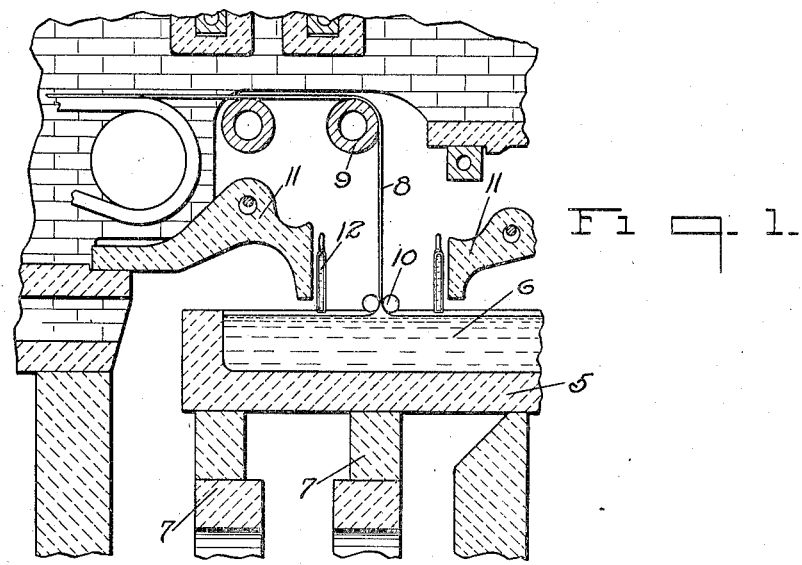
Figure 2:
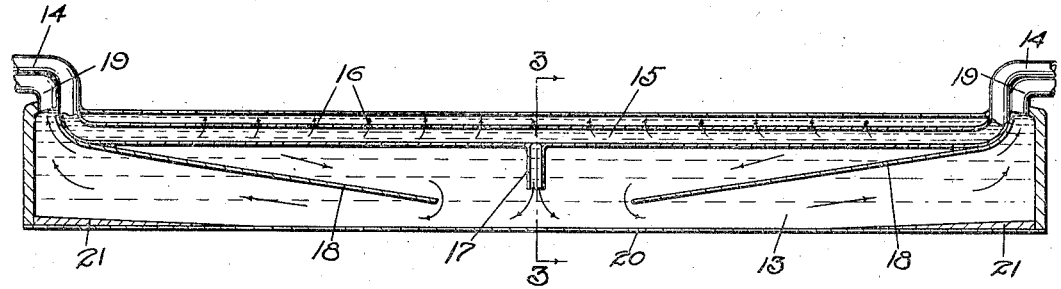
Figure 3:
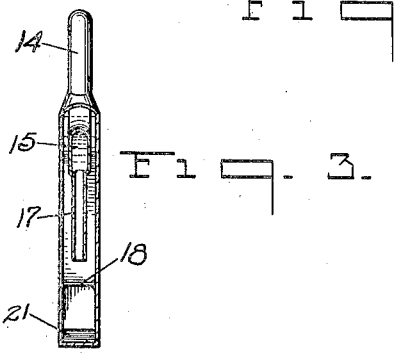
Figure 4:
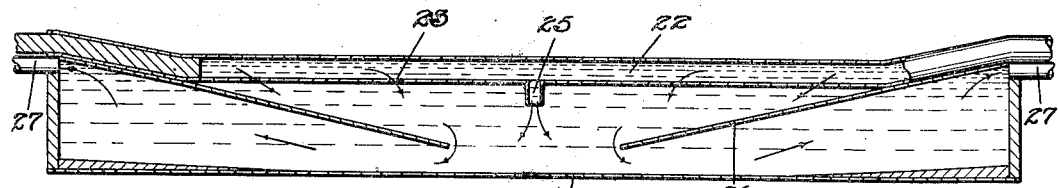

In the drawings wherein like numerals are employed to designate like parts throughout the same, Fig. 1 shows a fragmentary sectional view of one form of apparatus with which the invention may be used, Fig. 2 shows a longitudinal vertical section through one form of cooling medium which may be used, Fig. 3 is a section taken on line 3—3 in Fig. 2, and Fig. 4 is a longitudinal vertical section through a slightly modified construction.

In the drawings the numeral 5 designates a draw-pot which may be formed from a refractory material and which is supplied with a source of molten glass 6 from any form of tank. The pot 5 is supported upon stools 7, and is also heated from the bottom by means of burners, which are not shown. The sheet of glass 8 is drawn from the mass of molten glass 6, and is bent over a bending roll 9 to a horizontal plane, after which the sheet is passed through suitable flattening and annealing mechanisms. It is not necessary that the sheet 8 be bent over the bending roll 9 to obtain the benefits of the present invention, as this is merely one form of machine with which it may be used. To maintain the sheet to width knurled rollers 10 are arranged on opposite sides of the sheets at both edges thereof, and are driven at a speed to enable a relatively heavy knurled edge to be formed on the sheet which is capable of holding the same to width. Arranged above the pot 5 are cover or lip tiles 11, which tend to force any heat currents present at that position downwardly toward the surface of the molten glass 6.

In the type of apparatus here shown which is more specifically set forth in the Colburn Patent 1,248,809, granted Dec. 4, 1917, cooler members 12 are utilized to absorb heat from the surface of the glass before it is introduced into the sheet, and also to protect or shield the sheet 8 from heat currents from the tank. The coolers 12 are disposed relatively close to the surface of the molten glass from which the sheet is drawn, and absorb sufficient heat to permit a good sheet of glass to be drawn.

The molten glass 6 is not ordinarily uniform in temperature throughout its entire width of the draw-pot, as the border portions are relatively cooler than the central flow of glass. This difference in temperature between the border portions and the central flow of the molten glass from which the sheet is drawn causes difficulty in the drawing of a good sheet, and it is an important object of this invention to overcome the different temperature conditions existing, and to make uniform the temperature of the entire flow of glass throughout the entire width of the draw-pot.

With the form of coolers now in use the cooling medium is introduced at one end and is exhausted at the opposite end thereof. In this way it will be seen that the greatest heat absorption takes place at the inlet end of the cooler, and the amount of absorption gradually decreases across the width of the pot to the exhaust end thereof. With the present form of cooler the greatest heat absorption takes place above the hottest point of the flow of glass within the pot which has been pointed out is the center. The cooling medium is introduced within the cooler jacket 13 through the pipes 14 and flows through an internal pipe 15 which is preferably perforated along its upper surface with the openings 16. Centrally of the cooler or jacket 13 is a depending discharge spout 17. The cooling medium is introduced at both ends of the cooler 13 through the pipe 15 which is arranged relatively near the top of the cooler. During the flow of water through this pipe, some of the water will escape through the aperture 16, while the greater quantity will be discharged through the spout 17 which is approximately the center of the entire length of the cooler. To control the flow of the medium escaping through the aperture 16, downwardly inclined baffle plates 18 are provided which cause a flow as indicated by the arrows. The cooling medium introduced at the center of the cooler gradually spreads out towards opposite ends and exhausts through the pipes 19. To further reduce the heat absorption at the edge portions of the cooler, the bottom surface 20 of the cooler may be gradually thickened near its ends as at 21. In introducing the cooling medium centrally of the cooler and allowing it gradually to spread out to the ends thereof, it will be seen that the greatest heat absorption will take place in the middle of the cooler, while this heat absorption will be gradually reduced toward the end portions thereof.

In Fig. 4 a slightly different form of construction is shown. The inlet conduit 22 is provided with the apertures 23 along its lower edge or surface in a manner that the apertures communicate with the shell 24 forming the cooler. Disposed centrally of the shell 24 is a discharge spout 25 which will cause a greater quantity of cooling medium to be introduced at the center of the cooler as indicated by the arrows. The cooling medium passing through the apertures 23 will be directed by the baffle plates 26 downwardly and toward the center of the shell in a manner that all of the water or other medium will start from the center or approximately at the center and spread toward both ends of the shell and be removed through the outlet pipes 27.

With the forms of coolers just described it is possible to control the temperature of the glass from which the sheet 8 is being drawn in a manner that the central portion of the flow which is normally of a much higher temperature than the border portions will be lowered in temperature so that the glass will be substantially of an even temperature throughout its entire width. This makes it possible to produce a much more uniform sheet of glass.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, means for drawing a sheet of glass from a mass of molten glass, of means for lowering the temperature of the surface glass before it is drawn into the sheet, including means for introducing a cooling medium in proximity to and centrally of the said glass.

2. In sheet glass apparatus, means for drawing a sheet of glass from a mass of molten glass, of means for lowering the temperature of the surface glass thereof before it is drawn into the sheet, including means for introducing a cooling medium in proximity to and centrally of the said glass, and allowing the cooling medium to pass from the center toward both sides of said mass of molten glass.

3. In sheet glass apparatus, means for drawing a sheet of glass from a mass of molten glass, of means for lowering the temperature of the surface glass before it is drawn into the sheet, including means for continuously passing a cooling medium in proximity to the surface of said glass from the center toward both sides thereof.

4. In sheet glass apparatus, means for drawing a sheet of glass from a mass of molten glass, and cooling means disposed above the surface of the molten glass, comprising a casing, means for introducing a cooling medium centrally of the casing, and means for removing the cooling medium from the end thereof.

5. In sheet glass apparatus, means for drawing a sheet of glass from a mass of molten glass, and cooling means disposed above the surface of the molten glass, comprising a casing, means for discharging a cooling medium centrally of the casing and permitting it to flow toward the ends thereof, and means for removing the cooling medium therefrom.

6. In sheet glass apparatus, means for drawing a sheet of glass from a mass of molten glass, and cooling means arranged above the surface of the molten glass comprising a casing, means for introducing a cooling medium into the casing, means within the casing for directing the inflow centrally thereof, and means for removing the cooling medium from the ends of said casing.

7. In sheet glass apparatus, means for drawing a sheet of glass from a mass of molten glass, and cooling means arranged above the surface of the molten glass, comprising an elongated casing, a conduit passing therethrough and having apertures therein, and baffle plates arranged below the conduit.

8. A cooler of the character described, comprising a casing, means for introducing a cooling medium into the casing, means for directing the cooling medium centrally thereof, and means for removing the same from the ends thereof.

9. A cooler of the character described, comprising a casing, means for introducing a cooling medium into the casing, means for directing the cooling medium downwardly and centrally thereof, and for permitting the same to move toward both ends of the casing, and means for removing the same therefrom.

10. A cooler of the character described, comprising a casing, a conduit passing therethrough, and having apertures therein, and baffle plates arranged below said conduit.

11. A cooler of the character described, comprising a casing, a conduit passing therethrough, and having apertures therein, and downwardly inclined plates arranged below the conduit.

12. A cooler of the character described, comprising a casing, an apertured conduit passing therethrough, and a discharge spout carried by the conduit, and arranged centrally of said casing.

13. A cooler of the character described, comprising a casing, an apertured conduit passing therethrough, a discharge spout carried by the conduit and arranged centrally of the casing, and baffle plates disposed beneath said conduit.

14. A cooler of the character described, comprising a casing, an apertured conduit passing therethrough, a discharge spout carried by the conduit, and arranged centrally of said casing, and baffle plates positioned beneath the conduit.

15. A cooler of the character described, comprising a casing, and means to pass a cooling medium therethruogh, the bottom of said casing being relatively thicker near its ends than at the center thereof.

16. A cooler of the character described, comprising a casing, means for introducing a cooling medium into the casing, means for directing the cooling medium centrally thereof, means for removing the same from the ends thereof, the bottom of said casing being relatively thicker near its ends than at the center thereof.

Signed at Toledo, in the county of Lucas, and State of Ohio, this 1st day of Dec., 1924.

ENOCH T. FERNGREN.